(No Model.)
F. BURCKHARDT.
GRAIN STEAMER.
No. 305,142. Patented Sept. 16, 1884.
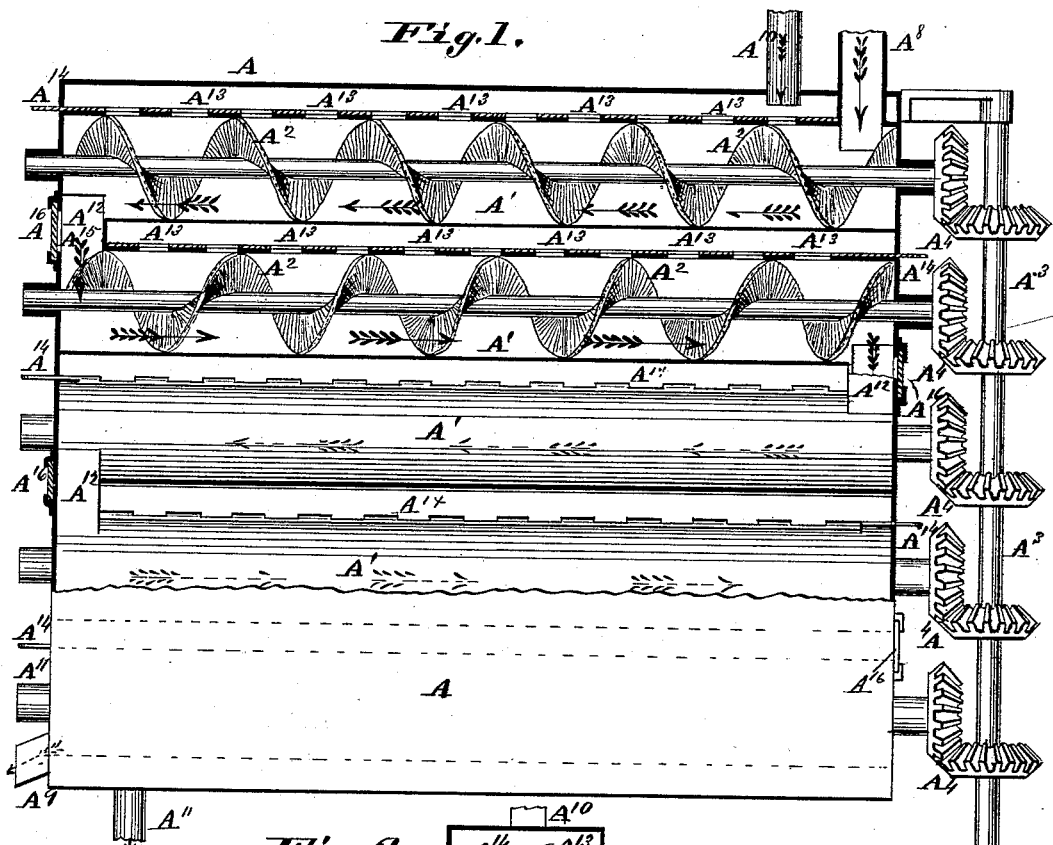
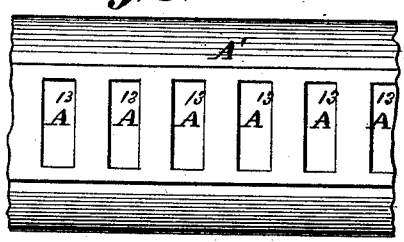
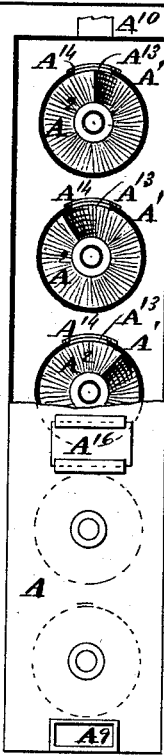
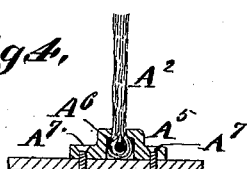
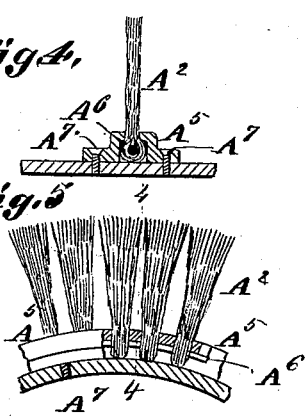
Attest:
Charles Pickles
Geo. L. Wheelock
Inventor:
Friedrich Burckhardt
By Knight Bros
attys

UNITED STATES PATENT OFFICE.

FREDRICH BURCKHARDT, OF ST. CHARLES, MISSOURI.

GRAIN-STEAMER.

SPECIFICATION forming part of Letters Patent No. 305,142, dated September 16, 1884.

Application filed December 31, 1883. (No model.)

*To all whom it may concern:*

Be it known that I, FREDRICH BURCKHARDT, of St. Charles, in the county of St. Charles and State of Missouri, have invented a certain new and useful Improvement in Grain-Steamers, of which the following is a full, clear, and exact description, reference being had to the accompanying drawings, forming part of this specification, and in which—

Figure 1 is a side elevation, part in vertical section. Fig. 2 is an end elevation, part in section. Fig. 3 is a detail top view of one of the conveyer-tubes. Fig. 4 is a transverse section taken on line 4 4, Fig. 5; and Fig. 5 is a detail transverse section of the screw-conveyer.

This invention relates to an apparatus for steaming grain, &c., and is more particularly intended for use for steaming corn in the manufacture of hominy, grits, &c.

This invention consists in features of novelty hereinafter fully described, and pointed out in the claims.

Referring to the drawings, A represents the outer casing of the apparatus, within which are conveyer-tubes $A'$, inclosing screw-conveyers $A^2$, driven or turned by means of a shaft, $A^3$, with which they are connected by miter-wheels $A^4$. The flights of the screw-conveyers consist of brushes secured to the shafts by bent plates $A^5$, (see Figs. 4 and 5,) the material from which the brushes are made being bent and passed through holes in the plates and held from coming out by wires $A^6$. The brushes are made of bent steel wires. The plates are connected to the shafts by screws $A^7$ or by other suitable means. By making the flights of the screw-conveyers of metallic brushes they polish and keep clean the interior of the tubes.

$A^8$ represents the pipe or spout through which the grain enters the apparatus, and $A^9$ the spout through which it is discharged.

$A^{10}$ represents the steam-supply pipe, and $A^{11}$ the pipe for the exhaust.

$A^{12}$ represents passage-ways forming communications between the opposite ends of the conveyer-tubes, so that the corn or grain will be discharged from one into another at opposite ends of the apparatus, as shown by the arrows in Fig. 1.

$A^{13}$ represents openings in the tops of the conveyer-tubes, which are controlled by valves $A^{14}$. The steam, entering the top of the apparatus, circulates through the tubes by means of the openings $A^{13}$, heating the corn as it is conveyed from end to end of the tubes, for the purpose of putting it in a condition to have the hulls removed, and by means of the valves any desired amount of steam may be allowed to enter the tubes.

$A^{15}$ represents peep-holes in the outer casing, closed by doors $A^{16}$, so that the interior of the apparatus may be examined.

I claim as my invention—

1. A grain-steamer comprising an outer casing, steam-pipes, grain supply and discharge pipes, and conveyer-tubes provided with screw-conveyers and openings supplied with valves, said conveyer-tubes communicating at their opposite ends, as set forth.

2. In a grain-steamer, the combination, with conveyer-tubes and shafts, of the bent plates having perforations, brushes formed of wires projecting through the perforations, and securing-wires, as set forth.

FREDRICH BURCKHARDT.

In presence of—
JNO. T. POWELL,
R. S. NELSON.